3,116,146
METHOD FOR SINTERING TUNGSTEN POWDER
Arno Gatti, Schenectady, N.Y., assignor to General
Electric Company, a corporation of New York
No Drawing. Filed July 27, 1961, Ser. No. 127,109
4 Claims. (Cl. 75—214)

This invention relates to powder metallurgy processing and more particularly to an improved process for obtaining high density sintered tungsten bodies.

The increasing use in recent years of refractory metals has resulted in the need for comparatively large and intricately-shaped tungsten bodies. The difficulties attending the fabrication of tungsten has resulted in complex and difficult shaping operations and therefore unreasonably high manufacturing costs. It has been thought that the fabrication of tungsten bodies of large dimensions could be rendered easier through powder metallurgy techniques. However, the densities of bodies heretofore produced by such powder techniques have been too low to enable their use in many situations where they would be otherwise desirable. Additionally, other techniques whereby the density was improved have been so complicated and difficult to control that the cost of producing the bodies became a severely limiting factor.

It is a principal object of this invention to provide an improved process for producing high density sintered tungsten bodies.

It is a further object of this invention to provide a process for producing high density sintered tungsten compacts in which powder tungsten is mixed with a small amount of nickel powder and the mixture sintered to final density.

Other objects and advantages will be in part obvious and in part explained by reference to the accompanying specification.

The present process generally comprises mixing a small amount of nickel powder, generally ranging from 0.05 to 0.50 weight percent, with tungsten powder, pressing the mixture and then effecting a sintering operation to produce a tungsten body of final density.

As an example of the densities which can be achieved in producing tungsten bodies according to this invention, a quantity of tungsten powder having an average particle diameter of 0.8 micron was mixed with 0.25 weight percent nickel powder which had an average particle diameter of 0.3 micron. The two metal powders were thoroughly mixed by mechanical means and pressed at 60 tons per square inch. The green body which resulted from the pressing operation had a density of 12.1 grams per cubic centimeter. The green body was then fired for one hour at 1100° C., at the termination of which time the density had increased to 19 grams per cubic centimeter or 98.5 percent of the theoretical density.

The size of the particles used in producing the sintered compacts is not particularly critical although, generally, powders having small particle sizes are more difficult to compact and sinter than those having comparatively large particle sizes. This is due to the presence of trapped air which is more difficult to remove from fine powders than from comparatively coarse powders. The compacting pressure used can be chosen according to existing powder metallurgy practices, the principal benefit derived from higher initial compacting pressure being a somewhat general reduction in the sintering time necessary to arrive at final density. Generally speaking, compacting pressures ranging upwardly from 5 tons per square inch will be suitable in obtaining green bodies for the final sintering operation.

The sintering temperature should generally not fall below 1050° C. and not exceed about 1500° C. and should preferably fall within the range of from about 1100° C. to 1300° C. If temperature below about 1050° C. are used, the sintering rate decreases to such an extent that excessive time periods are required to achieve high densities. On the other hand, if temperatures in excess of about 1450° C. to 1500° C. are used, a liquid phase resulting from the formation of a eutectic composition between the nickel and the tungsten will be formed.

A compact was produced which used larger particle sizes than those used to produce the compact of the first example and in this case, a final density of 89 percent of theoretical was obtained. In this instance, 0.50 weight percent nickel powder having an average particle size of 400 microns in diameter was mixed with a tungsten powder having a particle size of 0.8 micron diameter and the mixture pressed at 60 tons per square inch to obtain a green body. Firing was effected at 100° C. for about 16 hours to achieve the 89 percent density mentioned earlier. Generally, sintering times on the order of from 30 minutes to 4 hours will suffice to obtain high density tungsten bodies, although some improvement of density may be noted with longer sintering times.

Comparing the densities achieved through the admixture of nickel powder to tungsten prior to sintering and those obtained using only tungsten powder, tungsten powder of the same type and size as that used in the preceding examples was pressed and sintered in the same manner, but a density of only 68.5 percent that of theoretical density was obtained.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A process for improving the density of sintered tungsten compacts comprising, preparing a mixture consisting essentially of tungsten powder and from about 0.05 to 0.50 weight percent nickel powder, pressing the powder mixture into a green body, and firing the green compact at a temperautre of from about 1050° C. to about 1500° C. for a time sufficient to sinter the green compact into a body of final density.

2. A process for improving the density of sintered tungsten compacts comprising, preparing a mixture consisting essentially of tungsten powder and from about 0.1 to 0.30 weight percent nickel powder, pressing the powder mixture into a green body, and firing the green compact at a temperature of from about 1050° C. to about 1500° C. for a time sufficient to sinter the green compact into a body of final density.

3. A process for improving the density of sintered tungsten compacts comprising, preparing a mixture consisting essentially of tungsten powder and from about 0.05 to 0.50 weight percent nickel powder, pressing the powder mixture into a green body, and firing the green compact at a temperature of from about 1100° C. to 1300° C. for a time sufficient to sinter the green compact into a body of final density.

4. A process for improving the density of sintered tungsten compacts comprising, preparing a mixture consisting essentially of tungsten powder and from about 0.01 to 0.30 weight percent nickel powder, pressing the powder mixture into a green body, and firing the green compact at a temperature of from about 1100° C. to 1300° C. for a time sufficient to sinter the green compact into a body of final density.

References Cited in the file of this patent

FOREIGN PATENTS 233,885    Germany _____ Apr. 27, 1911

OTHER REFERENCES

Goetzel: "Treatise on Powder Metallurgy," vol. 2, 1950, pp. 62–64.

UNITED STATES PATENT OFFICE
CERTIFICATE OF CORRECTION

Patent No. 3,116,146 December 31, 1963

Arno Gatti

It is hereby certified that error appears in the above numbered patent requiring correction and that the said Letters Patent should read as corrected below.

Column 2, line 10, for "temperature" read -- temperatures --; line 25, for "100° C." read -- 1100° C. --.

Signed and sealed this 14th day of July 1964.

(SEAL)

Attest:

ESTON G. JOHNSON
Attesting Officer

EDWARD J. BRENNER
Commissioner of Patents